(12) United States Patent
Lyu et al.

(10) Patent No.: US 12,430,536 B2
(45) Date of Patent: Sep. 30, 2025

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Yang Lyu, Shanghai (CN); Chen Xi, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 910 days.

(21) Appl. No.: 17/456,597

(22) Filed: Nov. 26, 2021

(65) Prior Publication Data
US 2022/0092755 A1    Mar. 24, 2022

(30) Foreign Application Priority Data

Nov. 27, 2020 (CN) .......................... 202011360010.8

(51) Int. Cl.
| G06T 5/50 | (2006.01) |
| G06N 3/044 | (2023.01) |
| G06T 5/70 | (2024.01) |
| G06T 5/92 | (2024.01) |
| G06T 7/00 | (2017.01) |

(52) U.S. Cl.
CPC .............. *G06T 5/50* (2013.01); *G06N 3/044* (2023.01); *G06T 5/70* (2024.01); *G06T 5/92* (2024.01); *G06T 7/0012* (2013.01); *G06T 2207/20081* (2013.01); *G06T 2207/20084* (2013.01);
(Continued)

(58) Field of Classification Search
CPC .... G06T 5/50; G06T 5/70; G06T 5/92; G06T 7/0012; G06T 2207/20081; G06T 2207/20084; G06T 2207/20221; G06T 2207/30016; G06T 5/60; G06T 11/003;
(Continued)

(56) References Cited

U.S. PATENT DOCUMENTS

| 2017/0357879 A1* | 12/2017 | Odaibo .................. G06N 20/00 |
| 2018/0032846 A1* | 2/2018 | Yang .................... G06V 10/811 |

(Continued)

FOREIGN PATENT DOCUMENTS

| CN | 108896943 A | 11/2018 |
| CN | 109903228 A | 6/2019 |

(Continued)

OTHER PUBLICATIONS

Eugene J. Teoh et al., Phantom and Clinical Evaluation of the Bayesian Penalized Likelihood Reconstruction Algorithm Q.Clear on an LYSO PET/CT System, The Journal of Nuclear Medicine, 56(9): 1447-1452, 2015.

(Continued)

*Primary Examiner* — Lewis G West
(74) *Attorney, Agent, or Firm* — METIS IP LLC

(57) ABSTRACT

The present disclosure relates to systems and methods for image processing. The systems may acquire imaging data. The systems may generate multiple intermediate images based on the imaging data by performing image optimization of multiple image optimization dimensions using a plurality of trained machine learning models. The systems may generate a target image based on the intermediate images.

18 Claims, 11 Drawing Sheets

(52) U.S. Cl.
CPC .............. *G06T 2207/20221* (2013.01); *G06T 2207/30016* (2013.01)

(58) Field of Classification Search
CPC ..... G06T 2211/424; G06T 5/90; G06N 3/044; G06N 3/045; G06N 3/084

See application file for complete search history.

(56) References Cited

U.S. PATENT DOCUMENTS

| | | | | |
|---|---|---|---|---|
| 2018/0336689 | A1* | 11/2018 | Kabus | G06T 7/149 |
| 2019/0378270 | A1* | 12/2019 | Ida | G01R 33/5608 |
| 2021/0073527 | A1* | 3/2021 | Huang | H04L 61/103 |
| 2021/0150674 | A1* | 5/2021 | Cai | G06T 5/60 |
| 2021/0233259 | A1* | 7/2021 | Wang | G06T 7/0002 |
| 2021/0248501 | A1* | 8/2021 | Shin | G06N 5/042 |
| 2021/0383510 | A1* | 12/2021 | Sharma | G06T 5/70 |
| 2021/0406601 | A1* | 12/2021 | Narlikar | G06F 18/213 |
| 2022/0020146 | A1* | 1/2022 | Lyu | G16H 40/67 |
| 2022/0044034 | A1* | 2/2022 | RoyChowdhury | E01C 23/01 |
| 2022/0198611 | A1* | 6/2022 | Jia | H04N 25/671 |
| 2022/0383052 | A1* | 12/2022 | Yin | G06N 3/088 |
| 2024/0220768 | A1* | 7/2024 | Zhang | G06N 5/01 |

FOREIGN PATENT DOCUMENTS

| | | |
|---|---|---|
| CN | 111292240 A | 6/2020 |
| CN | 111311704 A | 6/2020 |
| WO | 2019019199 A1 | 1/2019 |

OTHER PUBLICATIONS

Yang, Bao et al., Artificial Neural Network Enhanced Bayesian PET Image Reconstruction, IEEE Transactions on Medical Imaging, 37(6): 1297-1309, 2018.

Gong, Kuang et al., Iterative PET Image Reconstruction Using Convolutional Neural Network Representation, IEEE Transactions on Medical Imaging, 38(3): 675-685, 2019.

Hongki Lim et al., Improved Low-Count Quantitative PET Reconstruction With an Iterative Neural Network, IEEE Transactions on Medical Imaging, 39(11): 3512-3522, 2020.

Gong, Kuang et al., PET Image Reconstruction Using Deep Image Prior, IEEE Transactions on Medical Imaging, 38(7): 1655-1665, 2019.

Chen, Hu et al., LEARN: Learned Experts' Assessment-based Reconstruction Network for Sparse-data CT, IEEE Transactions on Medical Imaging, 2018, 15 pages.

First Office Action in Chinese Application No. 202011360010.8 mailed on May 7, 2022, 13 pages.

\* cited by examiner

SYSTEMS AND METHODS FOR IMAGE PROCESSING

CROSS-REFERENCE TO RELATED APPLICATIONS

This application claims priority of Chinese Patent Application No. 202011360010.8 filed on Nov. 27, 2020, the contents of which are incorporated herein by reference.

TECHNICAL FIELD

The present disclosure generally relates to medical imaging, and in particular, to systems and methods for image processing.

BACKGROUND

A medical imaging scan may be performed using any one of a plurality of scanning systems, such as a magnetic resonance (MR) imaging system, a computed tomography (CT) imaging system, an X-ray imaging system, a positron emission tomography (PET) imaging system, a digital radiography (DR) system, or the like, or any combination thereof. Generally, during a medical imaging scan, the larger the amount of detected imaging data, the higher the imaging quality of images reconstructed based on the imaging data. However, in certain scenarios, such as low-dose imaging of a radiation-sensitive subject, imaging using ultra-long half-life/ultra-short half-life drugs, a high-temporal resolution dynamic imaging, or the like, sufficient imaging data cannot be obtained, which may cause relatively high noise in images reconstructed based on the insufficient imaging data. Therefore, it is desirable to provide systems and methods for image processing, thereby improving the image quality of the reconstructed images.

SUMMARY

An aspect of the present disclosure relates to a system for image processing. The system may include at least one storage device including a set of instructions and at least one processor in communication with the at least one storage device. When executing the set of instructions, the at least one processor may be directed to cause the system to implement operations. The operations may include acquiring imaging data. The operations may include generating multiple intermediate images based on the imaging data by performing image optimization of multiple image optimization dimensions using a plurality of trained machine learning models. The operations may further include generating a target image based on the intermediate images.

In some embodiments, the image optimization of multiple image optimization dimensions may include noise reduction, contrast improvement, resolution improvement, artifact correction, and/or brightness improvement.

In some embodiments, each of the plurality of trained machine learning models may be executed by one of a plurality of image processing subassemblies. The plurality of image processing subassemblies may include a first module and at least one second module downstream to the first module.

In some embodiments, each of the first module and the at least one second module may include a reconstruction unit, an optimization unit, and a fusion unit. The reconstruction unit may be configured to generate an initial image based on the imaging data. The optimization unit may be configured to generate, using a trained machine learning model corresponding to one of the multiple image optimization dimensions, an optimized image of the optimization dimension based on the initial image. The fusion unit may be configured to generate an intermediate image of the optimization dimension by fusing the initial image and the optimized image of the optimization dimension.

In some embodiments, the reconstruction unit in the first module may be configured to generate the initial image based on the imaging data and a preset initial image.

In some embodiments, the reconstruction unit in one of the at least one second module may be configured to generate the initial image based on the imaging data and the intermediate image generated by the fusion unit in the first module or a previous second module connected to the second module.

In some embodiments, the trained machine learning model in the first module may correspond to an image optimization dimension of the noise reduction.

In some embodiments, the generating the target image based on the intermediate images may include designating the intermediate image generated by the fusion unit in a last second module of the at least one second module as the target image.

In some embodiments, the trained machine learning model is obtained by a training process. The training process may include obtaining a plurality of training samples and determining the trained machine learning model by training a preliminary machine learning model based on the plurality of training samples. Each of the plurality of training samples may include a sample input image and a sample target image both of which are generated based on a sample data set.

In some embodiments, at least one of the sample input image of a training sample or the sample target image of the training sample may be generated by an iterative reconstruction operation including at least one iteration.

In some embodiments, the sample input images of at least two of the plurality of training samples may be generated based on a same sample data set.

In some embodiments, at least two of the plurality of training samples may share a same sample target image.

In some embodiments, the sample input image of a training sample may be generated based on a sample data set by a first process. The first process may include determining, based on the sample data set, a sample data subset by retrieving a portion of the sample data set that corresponds to a first sampling time, and determining, based on the sample data subset, the sample input image by a first iterative reconstruction operation including a first count of iterations. The target image of the training sample may be generated based on the sample data set by a second process including determining, based on the entire sample data set, the sample target image by a second iterative reconstruction operation including a second count of iterations. The entire sample data set may correspond to a second sampling time that is longer than the first sampling time. The first count may be the same as the second count.

In some embodiments, the sample input image of a training sample may be generated based on a sample data set by a third process. The third process may include determining, based on the sample data set, a sample data subset by retrieving a portion of the sample data set that corresponds to a third sampling time, and determining, based on the sample data subset, the sample input image by a third iterative reconstruction operation including a third count of iterations. The target image of the training sample may be generated based on the sample data set by a fourth process including determining, based on the sample data subset, the sample target image by a fourth iterative reconstruction operation including a fourth count of iterations. The fourth count may be larger than the third count.

In some embodiments, the sample input image of a training sample may be generated based on a sample data set by a fifth process. The fifth process may include determining, based on the sample data set, a first sample data subset by retrieving a portion of the sample data set that is subjected to a smoothing filtering operation, and determining, based on the first sample data subset, the sample input image by a fourth iterative reconstruction operation including a fourth count of iterations. The sample target image of the training sample may be generated based on the sample data set by a sixth process. The sixth process may include determining, based on the sample data set, a second sample data subset by retrieving a portion of the sample data set that is not subjected to a smoothing filtering operation, and determining, based on the second sample data subset, the sample target image by the fourth iterative reconstruction operation including the fourth count of iterations.

In some embodiments, the trained machine learning model may be a trained Feedback Convolutional Neural Network (FB-CNN) including a plurality of sequentially connected subnets. An input of the FB-CNN may be connected to an output of each of the plurality of subnets by a first connection component.

In some embodiments, each of the plurality of subnets may include at least one convolution block, at least one deconvolution block, and a feedback block (FB-block). An output of the FB-block in the subnet may be inputted into a next subnet connected to the subnet. The FB-block may include a plurality of convolution layers and deconvolution layers. A portion of the plurality of convolution layers and deconvolution layers may form projection groups each of which includes paired convolution layer and deconvolution layer. Different layers in at least part of the plurality of convolution layers and deconvolution layers may be connected via a second connection component.

A further aspect of the present disclosure relates to a method for image processing. The method may be implemented on a computing device including at least one processor, at least one storage medium, and a communication platform connected to a network. The method may include acquiring imaging data. The method may include generating multiple intermediate images based on the imaging data by performing image optimization of multiple image optimization dimensions using a plurality of trained machine learning models. The method may further include generating a target image based on the intermediate images.

In some embodiments, the image optimization of multiple image optimization dimensions may include noise reduction, contrast improvement, resolution improvement, artifact correction, and/or brightness improvement.

A still further aspect of the present disclosure relates to a non-transitory computer readable medium including executable instructions. When the executable instructions are executed by at least one processor, the executable instructions may direct the at least one processor to perform a method. The method may include acquiring imaging data. The method may include generating multiple intermediate images based on the imaging data by performing image optimization of multiple image optimization dimensions using a plurality of trained machine learning models. The method may further include generating a target image based on the intermediate images.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
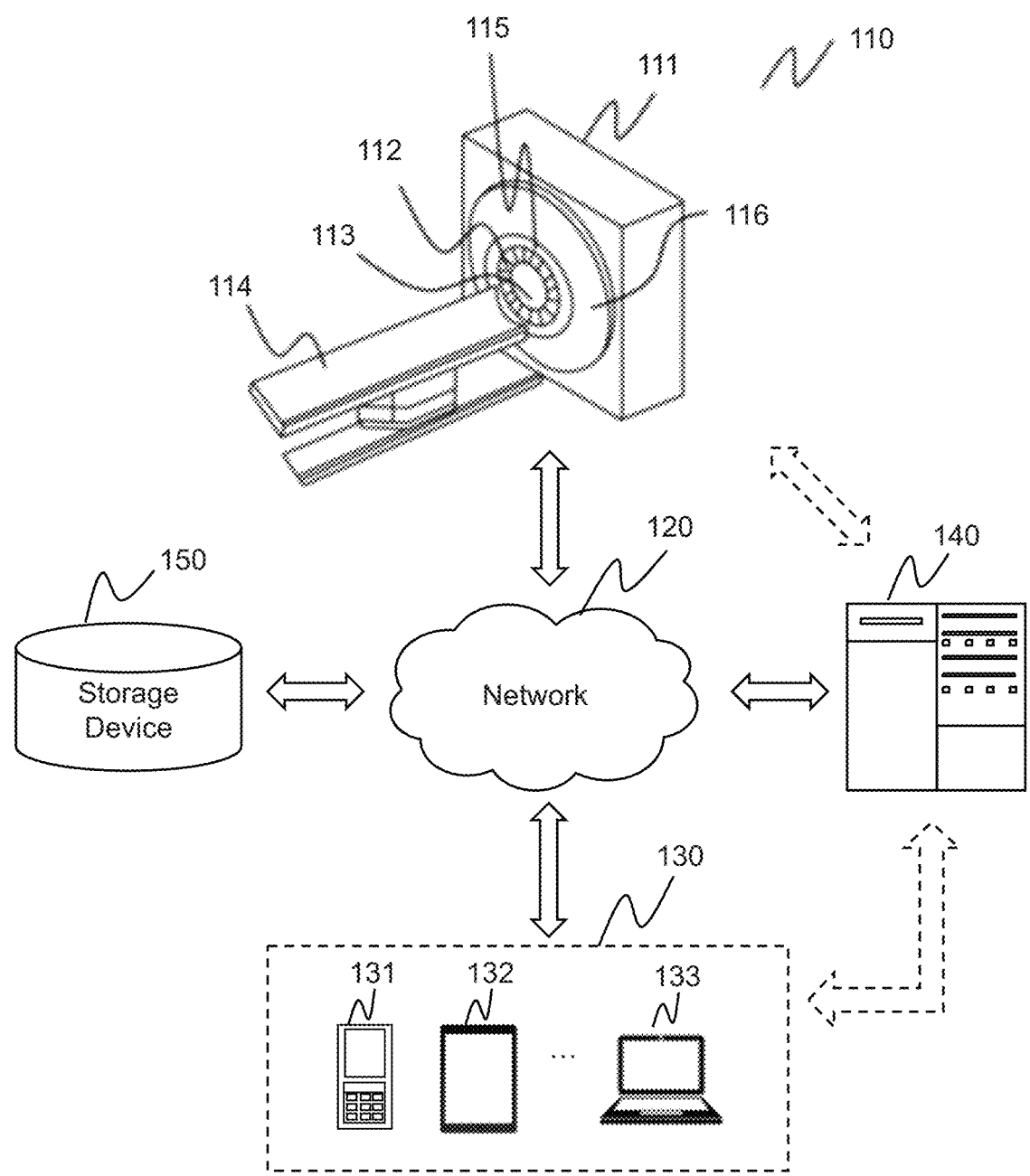
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

Generally, the words "module," "unit," or "block" used herein refer to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for performing on computing devices (e.g., processor 220 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to performing). Such software code may be stored, partially or fully, on a storage device of the performing computing device, for performing by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to imaging data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image. The term "region," "location," and "area" in the present disclosure may refer to a location of an anatomical structure shown in the image or an actual location of the anatomical structure existing in or on a target subject's body, since the image may indicate the actual location of a certain anatomical structure existing in or on the target subject's body.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

The present disclosure may provide systems and methods for image processing. The systems may obtain imaging data (e.g., scanning data). The systems may generate multiple intermediate images based on the imaging data by performing image optimization of multiple image optimization dimensions using a plurality of trained machine learning models (e.g., trained neural network models). The image optimization of multiple image optimization dimensions may include noise reduction, contrast improvement, resolution improvement, artifact correction, and/or brightness improvement. Further, the systems may generate a target image based on the intermediate images. According to some embodiments of the systems and methods of the present disclosure, by using the plurality of trained machine learning models, the multiple intermediate images are optimized in multiple image optimization dimensions, so that the generated target image also is optimized in the multiple image optimization dimensions, thereby comprehensively improving the image quality of the target image. Each of the plurality of trained machine learning models is configured to perform image optimization of only a single optimization dimension, which may simplify the training of the machine learning model, reduce the complexity of the trained machine learning model, and/or improve the robustness of the trained machine learning model. In addition, the plurality of trained machine learning models may be adjusted according to an actual imaging need. For example, multiple trained machine learning models may be available for use; in a particular application, in order to obtain a low-noise and high-contrast image, two trained machine learning models, out of the multiple trained machine learning models, may be involved each of which corresponds to one image optimization dimension of the noise reduction or the contrast improvement, respectively.

FIG. 1 is a schematic diagram illustrating an exemplary imaging system according to some embodiments of the present disclosure. As illustrated, the imaging system 100 may include an imaging device 110, a network 120, a terminal device 130, a processing device 140, and a storage device 150. The components of the imaging system 100 may be connected in one or more of various ways. For example, the imaging device 110 may be connected to the processing device 140 through the network 120. As another example, the imaging device 110 may be connected to the processing device 140 directly (as indicated by the bi-directional arrow in dotted lines linking the imaging device 110 and the processing device 140).

The imaging device 110 may scan a subject located within its detection region and generate or acquire data relating to the subject. For example, the imaging device 110 may scan the subject and generate scan data relating to the brain of the subject. In some embodiments, the subject may include a biological subject and/or a non-biological subject. For example, the subject may include a specific portion of a body, such as the head, the thorax, the abdomen, or the like, or a combination thereof. As another example, the subject may be a man-made composition of organic and/or inorganic matters that are with or without life. In some embodiments, the imaging system 100 may include modules and/or components for performing imaging and/or related analysis. In some embodiments, the data relating to the subject may include projection data, scanning data, one or more images of the subject, etc.

In some embodiments, the imaging device 110 may be a medical imaging device for disease diagnostic or research purposes. The medical imaging device may include a single modality scanner and/or a multi-modality scanner. The single modality scanner may include, for example, an ultrasound scanner, an X-ray scanner, a computed tomography (CT) scanner, a magnetic resonance imaging (MRI) scanner, an ultrasonography scanner, a positron emission tomography (PET) scanner, an optical coherence tomography (OCT) scanner, an intravascular ultrasound (IVUS) scanner, or the like, or any combination thereof. The multi-modality scanner may include, for example, an X-ray imaging-magnetic resonance imaging (X-ray-MRI) scanner, a positron emission tomography-X-ray imaging (PET-X-ray) scanner, a single photon emission computed tomography-magnetic resonance imaging (SPECT-MRI) scanner, a positron emission tomography-computed tomography (PET-CT) scanner, a digital subtraction angiography-magnetic resonance imaging (DSA-MRI) scanner, etc. It should be noted that the scanner described above is merely provided for illustration purposes, and not intended to limit the scope of the present disclosure. The term "imaging modality" or "modality" as used herein broadly refers to an imaging method or technology that gathers, generates, processes, and/or analyzes imaging information of a target subject.

In some embodiments, the imaging device 110 may include a supporting assembly 111 (e.g., a gantry), a detector assembly 112, a scanning table 114, an electronic module 115, and a cooling assembly 116.

The supporting assembly 111 may support one or more components of the imaging device 110 including, e.g., the detector assembly 112, the electronic module 115, the cooling assembly 116, etc. In some embodiments, the supporting assembly 111 may include a main gantry, a gantry base, a front cover plate, and a rear cover plate (not shown). The front cover plate may be connected to the gantry base. The front cover plate may be substantially perpendicular to the gantry base. As used herein, "substantially" indicates that a deviation (e.g., a deviation from being perpendicular) is below a threshold. For instance, the deviation of the angle between the front cover plate and the gantry base from 90° may be below a threshold, e.g., 10°, 8°, 5°, etc. The front cover plate may be mounted on the main gantry. The main gantry may include one or more supporting frames to accommodate the detector assembly 112 and/or the electronic module 115. The main gantry may include a substantially circular opening (e.g., a detection region 113) to accommodate a subject for scanning. In some embodiments, the opening of the main gantry may have another shape including, for example, an oval. The rear cover plate may be mounted on the main gantry opposing the front cover plate. The gantry base may support the front cover plate, the main gantry, and/or the rear cover plate. In some embodiments, the imaging device 110 may include a casing configured to cover and protect the main gantry.

The detector assembly 112 may detect radiation events (e.g., gamma photons) emitted from the detection region 113. In some embodiments, the detector assembly 112 may receive radiation rays (e.g., gamma rays) impinging on the detector assembly 112 and generate electrical signals. The detector assembly 112 may include one or more detector units. The one or more detector units may be packaged to form a detector block. One or more detector blocks may be packaged to form a detector cassette. One or more detector cassettes may be arranged to form a detector module. One or more detector modules may be arranged to form a detector ring.

The electronic module 115 may collect and/or process the electrical signals generated by the detector assembly 112. The electronic module 115 may include an adder, a multiplier, a subtracter, an amplifier, a drive circuit, a differential circuit, an integral circuit, a counter, a filter, an analog-to-digital converter (ADC), a lower limit detection (LLD) circuit, a constant fraction discriminator (CFD) circuit, a time-to-digital converter (TDC), a coincidence circuit, or the like, or any combination thereof. The electronic module 115 may convert an analog signal relating to an energy of radiation rays received by the detector assembly 112 to a digital signal. The electronic module 115 may compare a plurality of digital signals, analyze the plurality of digital signals, and determine imaging data based on the energies of radiation rays received by the detector assembly 112.

Merely by way of example, if the detector assembly 112 is part of a PET scanner that has a large (or long) axial field of view (FOV) (e.g., 0.75 meters to 2 meters long), the electronic module 115 may have a high data input rate from multiple detector channels. The electronic module 115 may collect the electrical signals from the detector assembly 112 through the detector channels. For example, the electronic module 115 may handle up to tens of billion events per second. In some embodiments, the data input rate may relate to a count of detector units in the detector assembly 112.

The cooling assembly 116 may produce, transfer, deliver, channel, or circulate a cooling medium to the imaging device 110 to absorb heat produced by the imaging device 110 during an imaging procedure. In some embodiments, the cooling assembly 116 may be entirely integrated into the imaging device 110 and be a part of the imaging device 110. In some embodiments, the cooling assembly 116 may be partially integrated into the imaging device 110. For example, a portion of the cooling assembly 116 may be integrated into the imaging device 110, while another portion of the cooling assembly 116 may be configured outside the imaging device 110. The cooling assembly 116 may allow the imaging device 110 to maintain a suitable and stable working temperature (e.g., 25° C., 30° C., 35° C., etc.). In some embodiments, the cooling assembly 116 may control the temperature of one or more target components of the imaging device 110. The target components may include the detector assembly 112, the electronic module 115, and/or any other components that generate heat in operation. The cooling medium may be gaseous, liquid (e.g., water), or the like, or any combination thereof. In some embodiments, the gaseous cooling medium may be air.

The network 120 may include any suitable network that can facilitate the exchange of information and/or data for the imaging system 100. In some embodiments, one or more components (e.g., the imaging device 110, the terminal device 130, the processing device 140, the storage device 150) of the imaging system 100 may communicate with one or more other components of the imaging system 100 via the network 120. For example, the processing device 140 may obtain imaging data from the imaging device 110 via the network 120. In some embodiments, the network 120 may be any type of wired or wireless network, or a combination thereof.

The terminal device 130 may include a mobile device 131, a tablet computer 132, a laptop computer 133, or the like, or any combination thereof. In some embodiments, the imaging device 110 and/or the processing device 140 may be remotely operated through the terminal device 130. In some embodiments, the imaging device 110 and/or the processing device 140 may be operated through the terminal device 130 via a wireless connection. In some embodiments, the terminal device 130 may receive information and/or instructions inputted by a user, and send the received information and/or instructions to the imaging device 110 or the processing device 140 via the network 120. In some embodiments, the terminal device 130 may receive data and/or information from the processing device 140. In some embodiments, the terminal device 130 may be part of the processing device 140. In some embodiments, the terminal device 130 may be omitted.

The processing device 140 may process data and/or information obtained from the imaging device 110, the terminal device 130, the storage device 150, and/or any other components associated with the imaging system 100. In some embodiments, the processing device 140 may process imaging data obtained from the imaging device 110 or the storage device 150. For example, the processing device 140 may generate multiple intermediate images based on the imaging data by performing image optimization of multiple image optimization dimensions using a plurality of trained machine learning models. Further, the processing device 140 may generate a target image based on the intermediate images. In some embodiments, the processing device 140 may be a single server or a server group. The server group may be centralized or distributed. In some embodiments, the processing device 140 may be local or remote. For example, the processing device 140 may access information and/or data stored in or acquired by the imaging device 110, the terminal device 130, the storage device 150, and/or any other components associated with the imaging system 100 via the network 120. As another example, the processing device 140 may be directly connected to the imaging device 110 (as illustrated by the bidirectional arrow in dashed lines connecting the processing device 140 and the imaging device 110 in FIG. 1), the terminal device 130 (as illustrated by the bidirectional arrow in dashed lines connecting the processing device 140 and the terminal device 130 in FIG. 1), and/or the storage device 150 to access stored or acquired information and/or data. In some embodiments, the processing device 140 may be implemented on a cloud platform. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the imaging device 110, the terminal device 130, and/or the processing device 140. For example, the storage device 150 may store the imaging data acquired by the imaging device 110, the plurality of trained machine learning models used for generating multiple intermediate images, the multiple intermediate images, and/or the target image. In some embodiments, the storage device 150 may store data and/or instructions that the processing device 140 may execute or use to perform exemplary methods described in the present disclosure. For example, the storage device 150 may store instructions that the processing device 140 may execute to process the imaging data acquired by the imaging device 110. In some embodiments, the storage device 150 may include a mass storage device, a removable storage device, a volatile read-and-write memory, a read-only memory (ROM), or the like, or any combination thereof. In some embodiments, the storage device 150 may be implemented on a cloud platform.

In some embodiments, the storage device 150 may be connected to the network 120 to communicate with one or more components (e.g., the imaging device 110, the processing device 140, the terminal device 130) of the imaging system 100. One or more components of the imaging system 100 may access the data or instructions stored in the storage device 150 via the network 120. In some embodiments, the storage device 150 may be directly connected to or communicate with one or more components (e.g., the imaging device 110, the processing device 140, the terminal device 130) of the Imaging system 100. In some embodiments, the storage device 150 may be part of the processing device 140.

In some embodiments, the imaging system 100 may further include one or more power supplies (not shown in FIG. 1) connected to one or more components (e.g., the imaging device 110, the processing device 140, the terminal device 130, the storage device 150) of the imaging system 100.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 2:
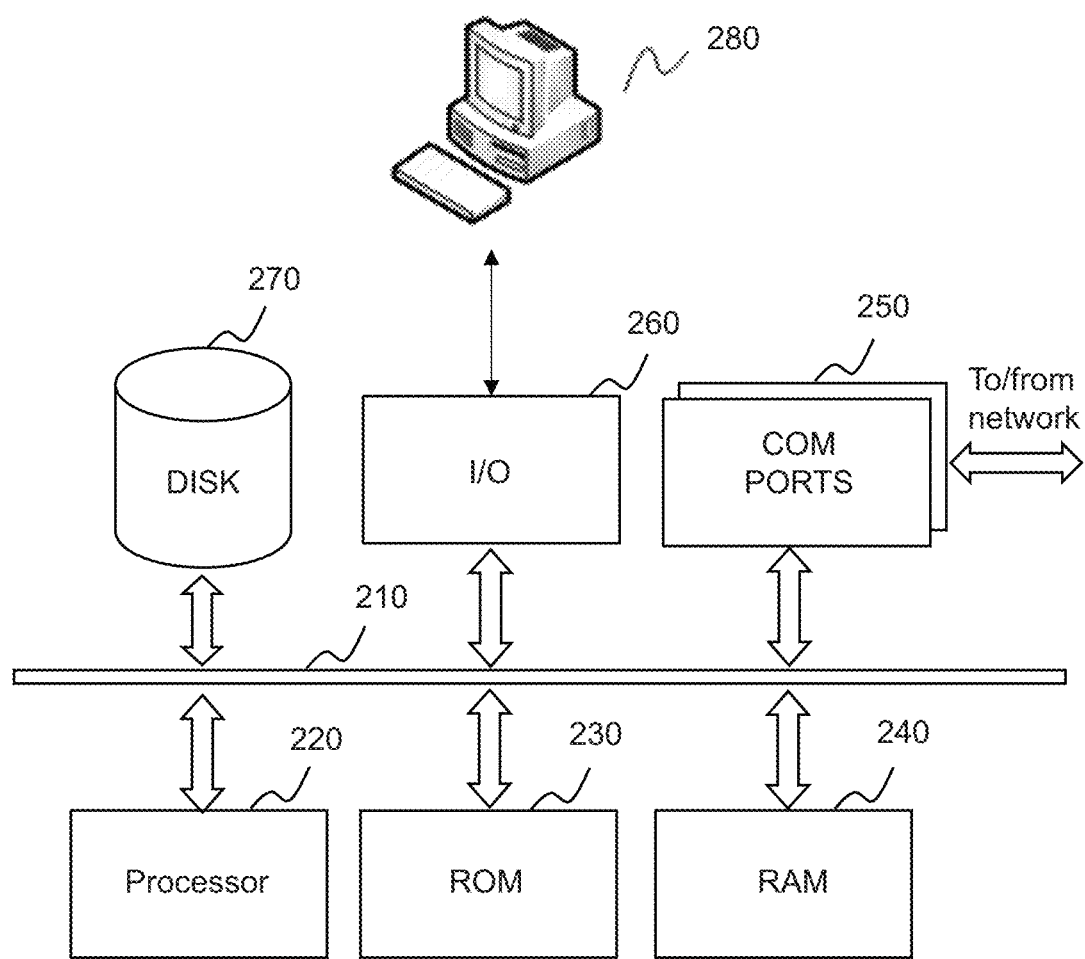
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the processing device 140 may be implemented on the computing device 200. As illustrated in FIG. 2, the computing device 200 may include a data bus 210, a processor 220, a read only memory (ROM) 230, a random access memory (RAM) 240, a communication port 250, an input/output (I/O) 260, a disk 270, and a user interface device 280.

The data bus 210 may be configured to implement data communications among components of the computing device 200. In some embodiments, hardware in the computing device 200 may transmit data via the data bus 210. For example, the processor 220 may send data to a storage or other hardware such as the I/O 260 via the data bus 210.

The processor 220 may execute computer instructions (program code) and perform functions of the processing device 140 in accordance with techniques described herein. The computer instructions may include routines, programs, objects, components, signals, data structures, procedures, modules, and functions, which perform particular functions described herein. For example, the processor 220 may acquire imaging data from the imaging device 110. The processor 220 may generate multiple intermediate images based on the imaging data by performing image optimization of multiple image optimization dimensions using a plurality of trained machine learning models. The processor 220 may further generate a target image based on the intermediate images.

Merely for illustration purposes, only one processor is described in the computing device 200. However, it should be noted that the computing device 200 in the present disclosure may also include multiple processors, and thus operations of a method that are performed by one processor as described in the present disclosure may also be jointly or separately performed by the multiple processors.

The ROM 230 and/or the RAM 240 may store data/information obtained from the imaging device 110, the terminal device 130, the storage device 150, or any other component of the imaging system 100. In some embodiments, the ROM 230 and/or the RAM 240 may store one or more programs and/or instructions to perform exemplary methods described in the present disclosure. For example, the ROM 230 and/or the RAM 240 may store a program for the processing device 140 for generating the target image based on the imaging data.

The communication port 250 may be connected to a network (e.g., the network 120) to facilitate data communications. The communication port 250 may establish connections between the processing device 140 and the imaging device 110, the terminal device 130, the storage device 150, or any other component of the imaging system 100. The connection may be a wired connection, a wireless connection, or a combination of both that enables data transmission and reception.

The I/O 260 may input or output signals, data, or information. In some embodiments, the I/O 260 may enable user interaction with the processing device 140. In some embodiments, the I/O 260 may include an input device and an output device. Merely by way of example, a user (e.g., an operator) may input data (e.g., a name, an age, a gender, a height, a weight, a medical history, contract information, a physical examination result) related to a subject (e.g., a patient) that is being/to be imaged/scanned through the I/O 260. The user may also input parameters needed for the operation of the imaging device 110, such as image contrast and/or ratio, a region of interest (ROI), slice thickness, an imaging type, a scan type, a sampling type, or the like, or any combination thereof. The I/O 260 may also display images (e.g., the multiple intermediate images, the target image) generated based on imaging data.

The computing device 200 may also include different forms of program storage units and data storage units. For example, the disk 270 may store various data files used for computer processing and/or communication, and program instructions executed by the processor 220. The user interface device 280 may implement interaction and information exchange between the computing device 200 and the user.

Figure 3:
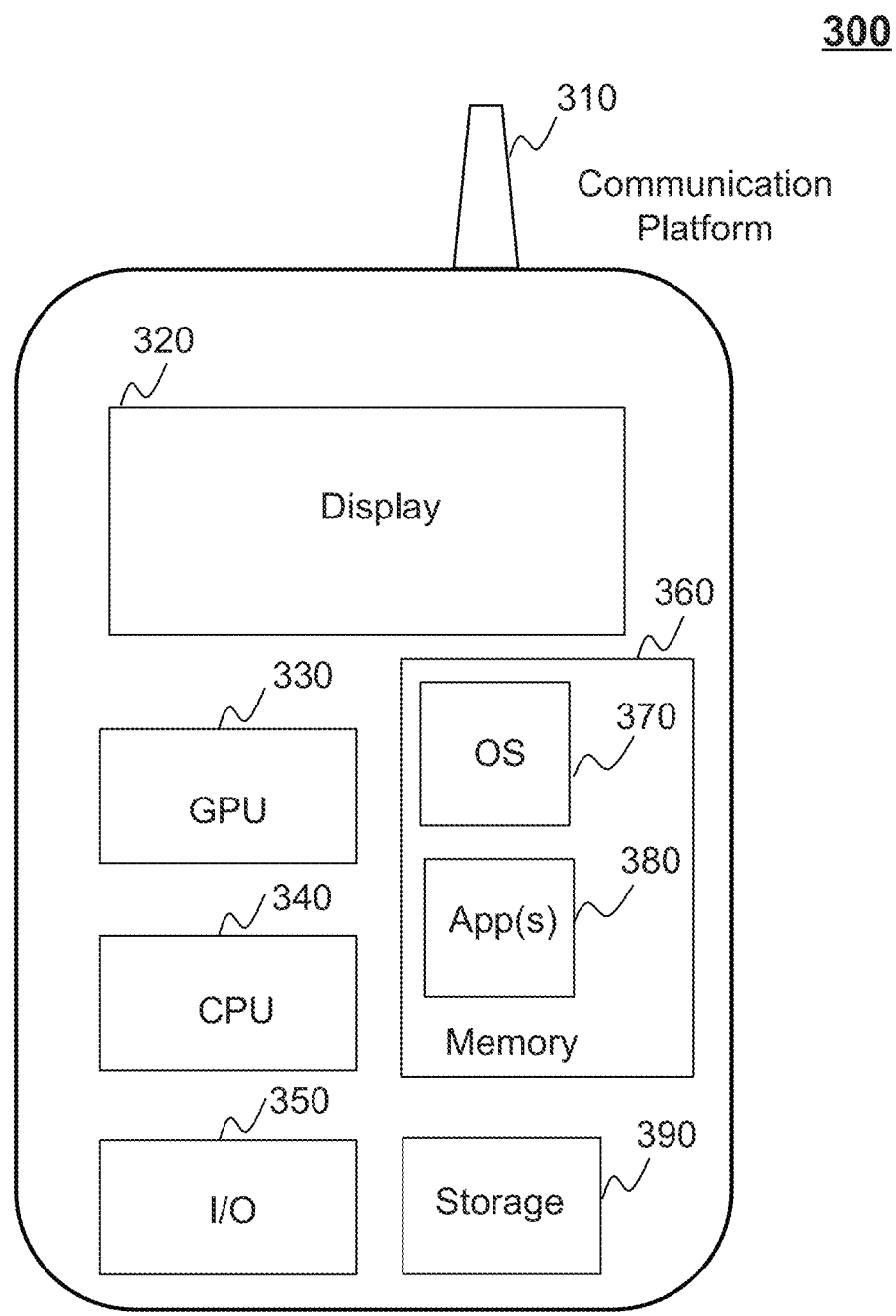
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the processing device 140 and/or the terminal device 130 may be implemented on the mobile device 300.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, a mobile operating system 370 (e.g., iOS, Android, Windows Phone) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

Figure 4A:
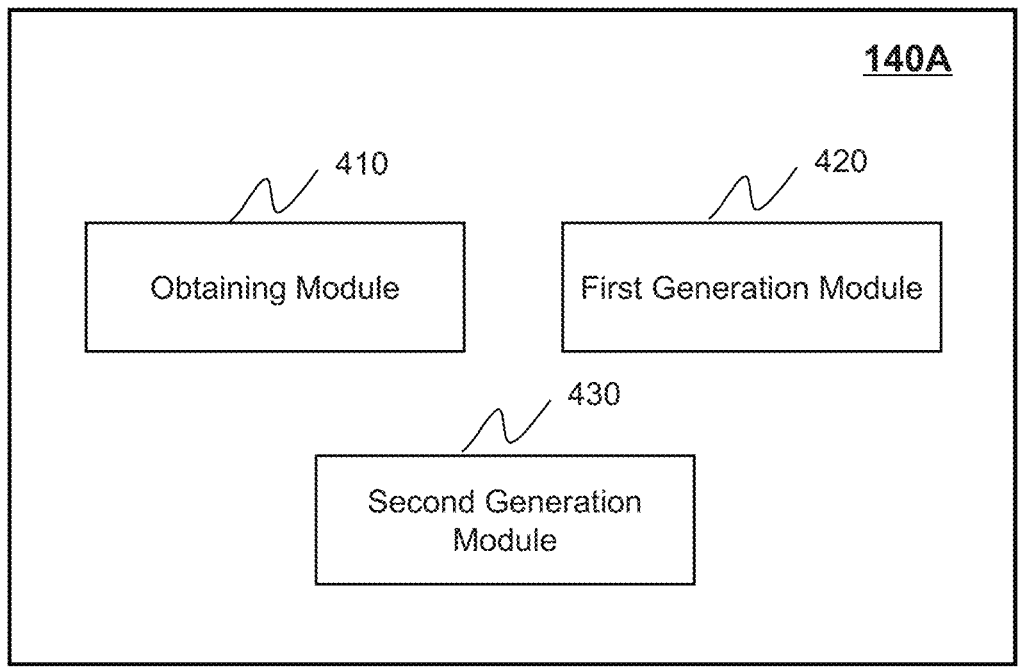
FIGS. 4A and 4B are block diagrams illustrating exemplary processing devices according to some embodiments of the present disclosure.
Figure 4B:
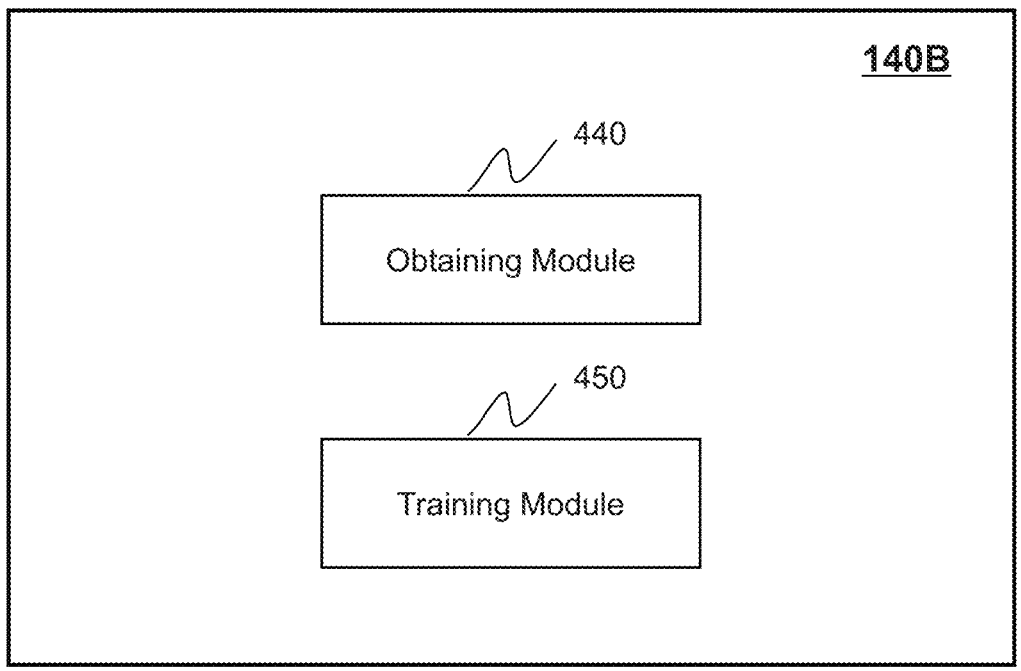

FIGS. 4A and 4B are block diagrams illustrating exemplary processing devices 140A and 140B according to some embodiments of the present disclosure. The processing devices 140A and 140B may be exemplary processing devices 140 as described in connection with FIG. 1. In some embodiments, the processing device 140A may be configured to apply a plurality of trained machine learning models for generating multiple intermediate images. The processing device 140B may be configured to obtain a plurality of training samples and/or determine one or more models (e.g., a trained machine learning model) using the training samples. In some embodiments, the processing devices 140A and 140B may be respectively implemented on a processing unit (e.g., a processor 220 illustrated in FIG. 2 or a CPU 340 as illustrated in FIG. 3). Merely by way of example, the processing device 140A may be implemented on a CPU 340 of a terminal device, and the processing device 140B may be implemented on a computing device 200. Alternatively, the processing devices 140A and 140B may be implemented on a same computing device 200 or a same CPU 340. For example, the processing devices 140A and 140B may be implemented on a same computing device 200.

As shown in FIG. 4A, the processing device 140A may include an obtaining module 410, a first generation module 420, and a second generation module 430.

The obtaining module 410 may be configured to acquire imaging data. More descriptions regarding the acquisition of the imaging data may be found elsewhere in the present disclosure. See, e.g., operation 510 and relevant descriptions thereof.

The first generation module 420 may be configured to generate multiple intermediate images based on the imaging data by performing, using a plurality of trained machine learning models, image optimization of multiple image optimization dimensions. In some embodiments, the image optimization of multiple image optimization dimensions may include noise reduction, contrast improvement, resolution improvement, or artifact correction, or the like, or any combination thereof. More descriptions regarding the generation of the multiple intermediate images may be found elsewhere in the present disclosure. See, e.g., operation 520 and relevant descriptions thereof.

The second generation module 430 may be configured to generate a target image based on the intermediate images. More descriptions regarding the generation of the target image may be found elsewhere in the present disclosure. See, e.g., operation 530 and relevant descriptions thereof.

As shown in FIG. 4B, the processing device 140B may include an obtaining module 440 and a training module 450.

The obtaining module 440 may be configured to obtain a plurality of training samples. Each of the plurality of training samples may include a sample input image and a sample target image. In some embodiments, both of the sample input image and the sample target image or a training sample may be generated based on a sample data set. More descriptions regarding the obtaining of the plurality of training samples may be found elsewhere in the present disclosure. See, e.g., operation 1110 and relevant descriptions thereof.

The training module 450 may be configured to determine the trained machine learning model by training a preliminary machine learning model based on the plurality of training samples. More descriptions regarding the determination of the trained machine learning model may be found elsewhere in the present disclosure. See, e.g., operation 1120 and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140A and/or the processing device 140B may share two or more of the modules, and any one of the modules may be divided into two or more units. For instance, the processing devices 140A and 140B may share a same obtaining module; that is, the obtaining module 410 and the obtaining module 440 are a same module. In some embodiments, the processing device 140A and/or the processing device 140B may include one or more additional modules, such as a storage module (not shown) for storing data. In some embodiments, the processing device 140A and the processing device 140B may be integrated into one processing device 140.

Figure 5:
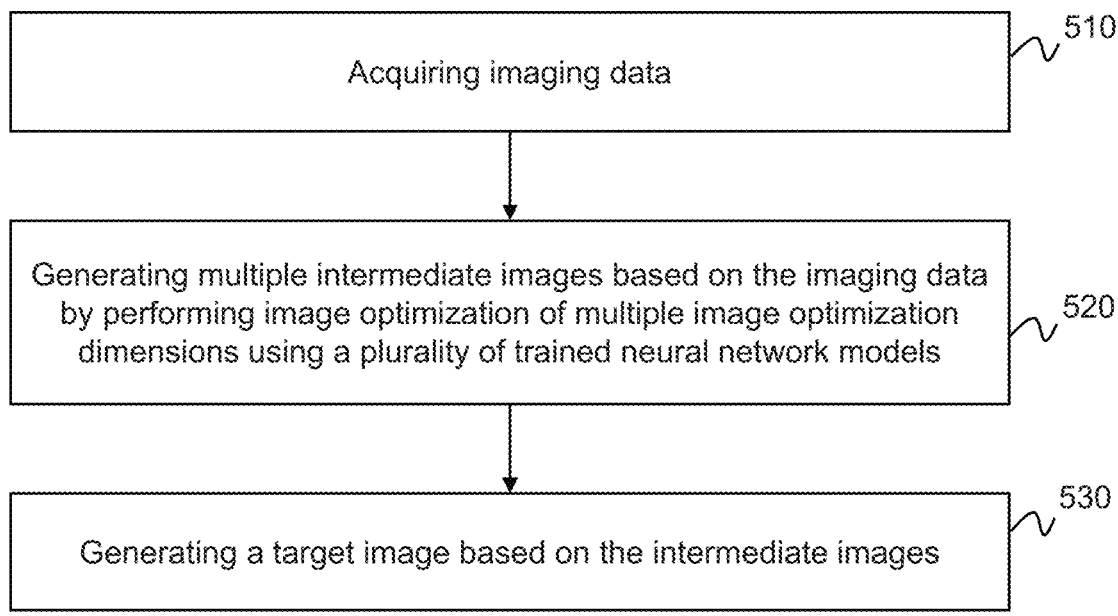
FIG. 5 is a flowchart illustrating an exemplary process for image processing according to some embodiments of the present disclosure.

FIG. 5 is a flowchart illustrating an exemplary process for image processing according to some embodiments of the present disclosure. In some embodiments, process 500 may be executed by the imaging system 100. For example, the process 500 may be implemented as a set of instructions (e.g., an application) stored in a storage device (e.g., the storage device 150, the ROM 230, the RAM 240, the storage 390). In some embodiments, the processing device 140A (e.g., the processor 220 of the computing device 200, the CPU 340 of the mobile device 300, and/or one or more modules illustrated in FIG. 4A) may execute the set of instructions and may accordingly be directed to perform the process 500.

In 510, the processing device 140A (e.g., the obtaining module 410 illustrated in FIG. 4A, the interface circuits of the processor 220) may acquire imaging data (also referred to as "raw data").

In some embodiments, the imaging data may be acquired based on an interaction between a subject (e.g., a human body) and a medium provided or detected by an imaging device (e.g., the imaging device 110 illustrated in FIG. 1) during a medical scanning process. As described in connection with FIG. 6, the subject may include a biological subject (e.g., a specific portion of a body, such as the head, the thorax, the abdomen) and/or a non-biological subject (e.g., a man-made composition of organic and/or inorganic matters that are with or without life). Exemplary mediums may include an X-ray beam, an electromagnetic field, an ultrasonic wave, a radioactive tracer, or the like, or any combination thereof.

In some embodiments, the imaging data may be obtained from the imaging device directly. For example, during a medical scanning process of the imaging device 110, the subject may be placed on the scanning table 114 and scanned in the detection region 113 by the imaging device 110. The detector assembly 112 may detect radiation (e.g., gamma photons) and generate electrical signals. The electronic module 115 may process the electrical signals and generate the imaging data. Further, the processing device 140A may obtain the imaging data from the electronic module 115 directly. In some embodiments, the imaging data may be retrieved from a storage device (e.g., the storage device 150) disclosed elsewhere in the present disclosure. For example, the imaging data generated by the imaging device 110 may be transmitted to and stored in the storage device 150. The processing device 140A may obtain the imaging data from the storage device 150.

In 520, the processing device 140A (e.g., the first generation module 420 illustrated in FIG. 4A, processing circuits of the processor 220) may generate multiple intermediate images based on the imaging data by performing, using a plurality of trained machine learning models, image optimization of multiple image optimization dimensions.

In some embodiments, the image optimization of multiple image optimization dimensions may include noise reduction, contrast improvement, resolution improvement, or artifact correction, or the like, or any combination thereof. For example, the image optimization of multiple image optimization dimensions may include at least two of the noise reduction, the contrast improvement, the resolution improvement, the artifact correction, or brightness improvement. As another example, the image optimization of multiple image optimization dimensions may include the noise reduction and the contrast improvement.

In some embodiments, each of the plurality of trained machine learning models may be configured to perform image optimization of one of the multiple image optimization dimensions, thereby simplifying the training of the machine learning model, reducing the complexity of the trained machine learning models, and/or improving the robustness of the trained machine learning models. In some embodiments, one of the plurality of trained machine learning models may be configured to perform image optimization of at least two of the multiple image optimization dimensions. In some embodiments, the plurality of trained machine learning models may be connected such that the output of a trained machine learning model may be used as the input of a next trained machine learning model.

In some embodiments, a trained machine learning model may include a trained neural network model, for example, a deep neural network (DNN) model, a convolutional neural network (CNN) model, a recurrent neural network (RNN) model, a feature pyramid network (FPN) model, etc. Exemplary CNN models may include a V-Net model, a U-Net model, a FB-Net model, a Link-Net model, or the like, or any combination thereof. An exemplary FB-Net model may be a trained Feedback Convolutional Neural Network (FB-CNN) including a plurality of sequentially connected subnets. More descriptions regarding the FB-CNN may be found elsewhere in the present disclosure. See, e.g., FIG. 9, FIG. 10, and the descriptions thereof.

In some embodiments, a trained machine learning model may be trained offline or online. In some embodiments, the training (regardless of whether the training is performed online or offline) of a trained machine learning model may be performed according to the process exemplified in FIG. 11. The difference between an online training and an offline training may include whether the training is performed at the time of its application or in advance, etc.

In some embodiments, a trained machine learning model may be executed by one of a plurality of image processing subassemblies. That is, the plurality of image processing subassemblies may be configured to perform the image optimization of multiple image optimization dimensions. In some embodiments, the plurality of trained machine learning models may be integrated into and executed by the first generation module 420 illustrated in FIG. 4A. For instance, the first generation module 420 may be configured as a plurality of image processing subassemblies each of which is configured to execute a trained machine learning model of an image optimization dimension. In some embodiments, the plurality of image processing subassemblies may be connected. As used herein, component A (e.g., an image processing subassembly) and component B (e.g., an image processing subassembly) are considered connected to each other if the output of component A, without further processing by another component, is used as the input of component B and at the same time the connection between component A and component B is not bridged by another component. In some embodiments, at least a portion of the plurality of image processing subassemblies may be sequentially connected. As used herein, multiple components (e.g., multiple image processing subassemblies) are considered sequentially connected if each of the multiple image processing subassemblies are connected to no more than one upstream image processing subassembly and no more than one downstream image processing subassembly. In some embodiments, any two of the plurality of image processing subassemblies may be connected to each other. In some embodiments, the plurality of image processing subassemblies may include a first module and at least one second module downstream to the first module. More descriptions regarding the plurality of image processing subassemblies may be found elsewhere in the present disclosure. See, e.g., FIG. 6, and relevant descriptions thereof.

In some embodiments, each of the first module and the at least one second module may include a reconstruction unit, an optimization unit, and a fusion unit. See, e.g., FIG. 7 and the description thereof. The reconstruction unit may be configured to generate an initial image based on the imaging data. In some embodiments, the reconstruction unit may generate the initial image by performing a reconstruction operation on the imaging data. Exemplary reconstruction operations may include a projection operation, a transformation operation, or the like, or any combination thereof. Exemplary projection operations may include forward projection and back projection. In some embodiments, the projection operation may be performed based on an iterative reconstruction algorithm. For example, the reconstruction unit may perform forward projection and back projection iteratively. Exemplary transformation operations may include a transformation operation and an inverse transformation operation. In some embodiments, the transformation operation may be performed based on an iterative reconstruction algorithm. For example, the reconstruction unit may perform the transformation operation and the inverse transformation operation iteratively. In each iteration, the reconstruction unit may determine whether a termination condition is satisfied in the current iteration. Exemplary termination conditions may include that a certain count of iterations has been performed, a difference between the reconstructed images in the current iteration and the previous iteration is less than a certain threshold, etc. The certain count may be a default value of the imaging system 100, manually set by a user or an operator, or determined according to an actual need. If the termination condition is satisfied in the current iteration, the reconstruction unit may designate the reconstructed image in the current iteration as an initial image.

In some embodiments, the reconstruction unit in the first module may be configured to generate the initial image based on the imaging data and a preset initial image. The preset initial image may be preset according to a default setting, manually set by a user (e.g., a doctor, a technician, etc.) or an operator, or determined by the processing device 140A according to an actual need. For example, values of pixels or voxels in the preset initial image may be preset to 1. In some embodiments, the reconstruction unit in one of the at least one second module may be configured to generate the initial image based on the imaging data and an intermediate image generated by the fusion unit in the first module or a previous second module that is connected to the second module.

An exemplary iterative two-dimensional (2D) reconstruction algorithm may be performed according to Equation (1) below:

$$\tilde{f}_i^{N+1} = \frac{f_i^N}{\sum_j a_{ij}} \times \sum_j a_{ij} \frac{y_j}{\sum_j a_{ij} f_i^N}, \qquad (1)$$

where $\tilde{f}_i^{N+1}$ denotes a reconstructed image in the current iteration, $f_i^N$ denotes the preset initial image or the intermediate image, $y_j$ denotes the imaging data, $a_{ij}$ denotes a system matrix of the iterative reconstruction algorithm, ij denotes a position of a pixel in the imaging data, N denotes a count of iterations, and N is an integer greater than or equal to 1.

The optimization unit may be configured to generate, using a trained machine learning model corresponding to one of the multiple image optimization dimensions, an optimized image of the optimization dimension based on the initial image. For example, the initial image generated by the reconstruction unit may be input into the trained machine learning model, and an output of the trained machine learning model may be obtained as the optimized image of the optimization dimension. The trained machine learning model may be configured to perform the image optimization of the image optimization dimension on the initial image. Merely by way of example, the trained machine learning model in the first module may correspond to an image optimization dimension of the noise reduction, and the trained machine learning model in each of the at least one second module may correspond to an image optimization dimension of the contrast improvement, the resolution improvement, the artifact correction, or brightness improvement. For example, the plurality of image processing subassemblies may include a first module corresponding to the image optimization dimension of the noise reduction and a second module corresponding to the image optimization dimension of the contrast improvement.

Merely by way of example, the optimization unit may generate an optimized image according to Equation (2) below:

$$\tilde{f}_{NN}^{N+1} = NN(\tilde{f}_i^{N+1}), \qquad (2)$$

where $\tilde{f}_{NN}^{N+1}$ denotes the optimized image, $\tilde{f}_i^{N+1}$ denotes the initial image, and NN denotes the trained machine learning model.

The fusion unit may be configured to generate an intermediate image of the optimization dimension by fusing the initial image and the optimized image of the optimization dimension. In some embodiments, the initial image and the optimized image may be fused based on a weight coefficient between the initial image and the optimized image. The weight coefficient may be a default value of the imaging system 100, manually set by a user or an operator, or determined according to an actual need. Merely by way of example, the initial image and the optimized image may be fused according to Equation (3) below:

$$f^{N+1} = \eta \times \tilde{f}_{NN}^{N+1} + (1-\eta) \times \tilde{f}_i^{N+1}, \quad (3)$$

where $f^{N+1}$ denotes the intermediate image, it denotes a weight coefficient of the optimized image $\tilde{f}_{NN}^{N+1}$, and $1-\eta$ denotes a weight coefficient of the initial image $\tilde{f}_i^{N+1}$. More descriptions regarding the first module and/or the second module may be found elsewhere in the present disclosure. See, e.g., FIG. 7, FIG. 8, and the descriptions thereof.

In 530, the processing device 140A (e.g., the second generation module 430 illustrated in FIG. 4A, processing circuits of the processor 220) may generate a target image based on the intermediate images.

The target image may refer to an image determined by the image optimization of multiple image optimization dimensions.

In some embodiments, the processing device 140A may designate the intermediate image generated by the fusion unit in a last second module of the at least one second module as the target image. In some embodiments, the processing device 140A may designate the optimized image output from the optimization unit in a last second module of the at least one second module as the target image. That is, the fusion operation may be omitted. In some embodiments, by using the plurality of trained machine learning models, the multiple intermediate images are optimized in multiple image optimization dimensions, so that the target image generated based on the intermediate images is also optimized in the multiple image optimization dimensions, thereby comprehensively improving the image quality of the target image. In some embodiments, the generated target image may be used for a purpose including, e.g., disease diagnostic, treatment, research, or the like, or a combination thereof.

It should be noted that the method for image processing illustrated in the process 500 may be executed on a console of a medical device (e.g., the imaging device 110), or may be executed on a post-processing workstation of the medical device, on the terminal device 130 that communicates with the medical device, or on the computing device 200 that implements a processing engine, according to actual application needs.

It should be noted that the above description of the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the reconstruction operation in operation 520 may also be performed according to other reconstruction techniques, such as an algebraic reconstruction technique (ART), a simultaneous algebraic reconstruction technique (SART), a penalty weighted least squares (PWLS) technique, or the like, or any combination thereof. Reconstruction units in a first module and a second module or in different second modules may perform the reconstruction operation according to different reconstruction techniques.

Figure 6:
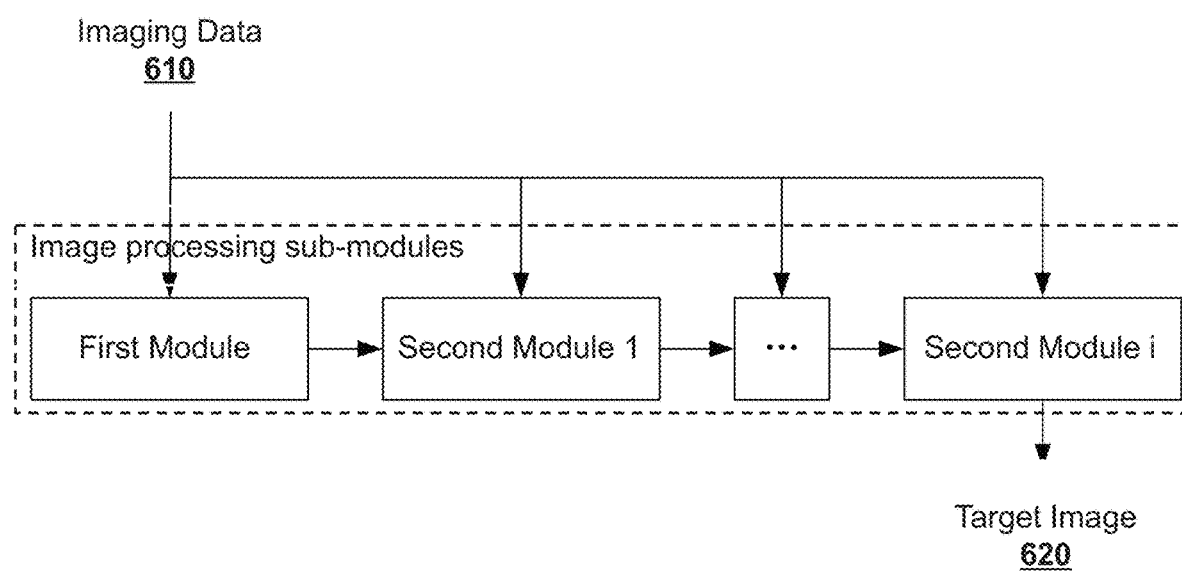
FIG. 6 is a schematic diagram illustrating exemplary image processing subassemblies according to some embodiments of the present disclosure.

FIG. 6 is a schematic diagram illustrating exemplary image processing subassemblies according to some embodiments of the present disclosure.

As illustrated in FIG. 6, the image processing subassemblies include a first module and a plurality of second modules (e.g., a second module 1, . . . , a second module i) downstream to the first module. The first module and the plurality of second modules may be configured to perform image optimization of multiple image optimization dimensions (e.g., noise reduction, contrast improvement, resolution improvement, artifact correction, brightness improvement, etc.). For example, the first module may perform image optimization of an image optimization dimension of the noise reduction, the second module 1 may perform image optimization of an image optimization dimension of the contrast improvement, and the second module i may perform image optimization of an image optimization dimension of the resolution improvement. In some embodiments, imaging data 610 may be input into the first module and the plurality of second modules respectively. The first module may generate an output based on the imaging data 610, and further input the output of the first module into the second module 1 that is directly connected to the first module. The second module 1 may generate an output based on the imaging data 610 and the output of the first module, and the output of the second module 1 may be used as input to a next second module that is directly connected to the second module 1. The output of the last second module i may be a target image 620.

Figure 7:
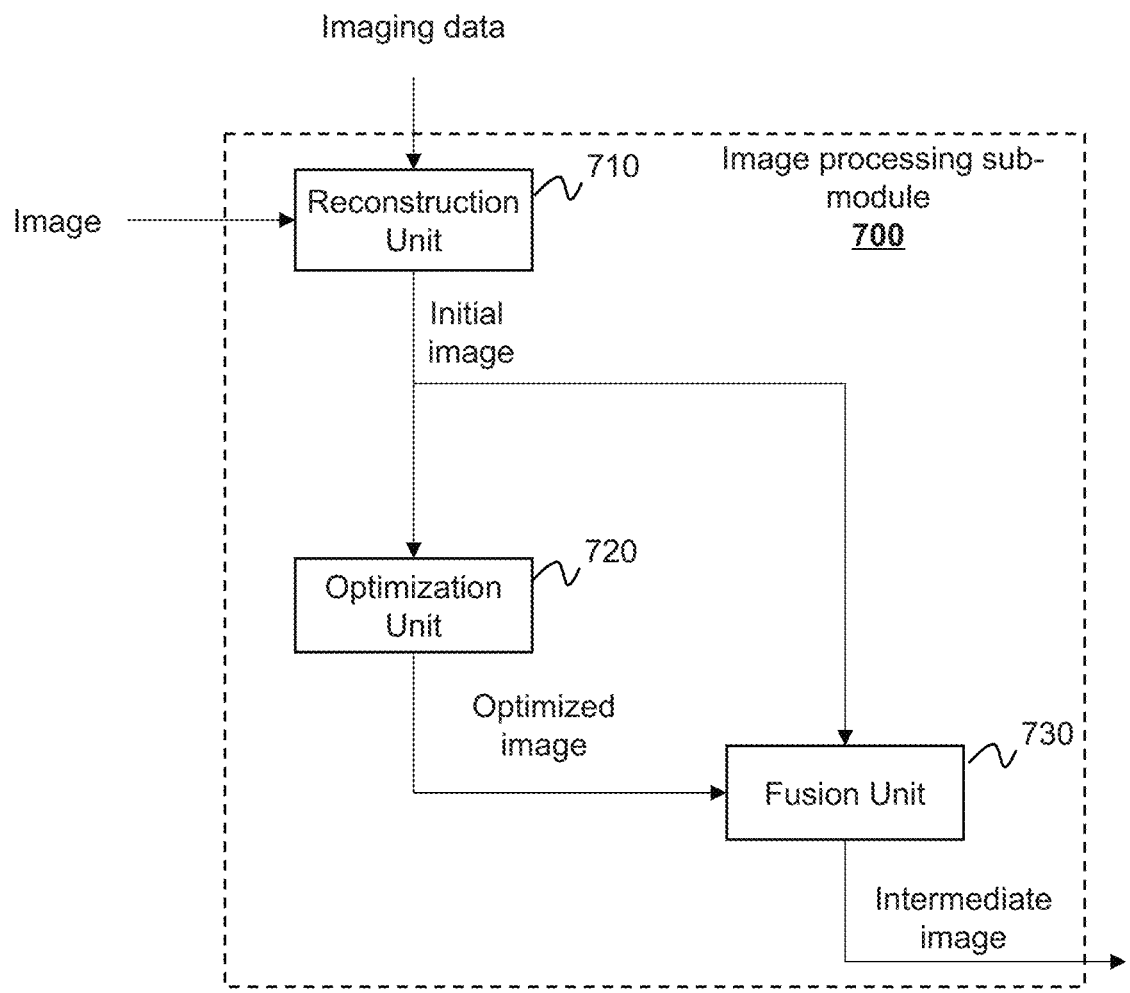
FIG. 7 is a schematic diagram illustrating an exemplary image processing subassembly according to some embodiments of the present disclosure.

FIG. 7 is a schematic diagram illustrating an exemplary image processing subassembly according to some embodiments of the present disclosure.

In some embodiments, the image processing subassembly 700 may be a first module or a second module in a plurality of image processing subassemblies. As illustrated in FIG. 7, the image processing subassembly 700 may include a reconstruction unit 710, an optimization unit 720, and a fusion unit 730. The reconstruction unit 710 may be configured to generate an initial image based on imaging data and/or an image. When the image processing subassembly 700 is the first module, the image may be a preset initial image (e.g., an image with all pixel values or voxel values of 1). When the image processing subassembly 700 is a second module, the image may be an intermediate image generated by a fusion unit 730 in a previous image processing subassembly connected to the image processing subassembly 700. Further, the reconstruction unit 710 may transmit the initial image to the optimization unit 720. The optimization unit 720 may be configured to generate, using a trained machine learning model corresponding to an image optimization dimension, an optimized image of the optimization dimension based on the initial image. Further, the optimization unit 720 may transmit the optimized image of the optimization dimension to the fusion unit 730. The fusion unit 730 may be configured to generate an intermediate image of the optimization dimension by fusing the initial image and the optimized image of the optimization dimension. Further, the fusion unit 730 may transmit the intermediate image of the optimization dimension to a next image processing subassembly connected to the image processing subassembly 700. In some embodiments, when the image processing subassembly 700 is a last module of the plurality of image processing subassemblies, the intermediate image generated by the fusion unit 730 may be designated as a target image, so that features of the initial image and the optimized image may both be retained in the target image, thereby improving the image quality of the intermediate image. In some embodiments, the fusion unit 730 may be omitted, and the optimized image generated by the optimization unit 720 in the last module of the plurality of image processing subassemblies may designated as the target image.

Figure 8:
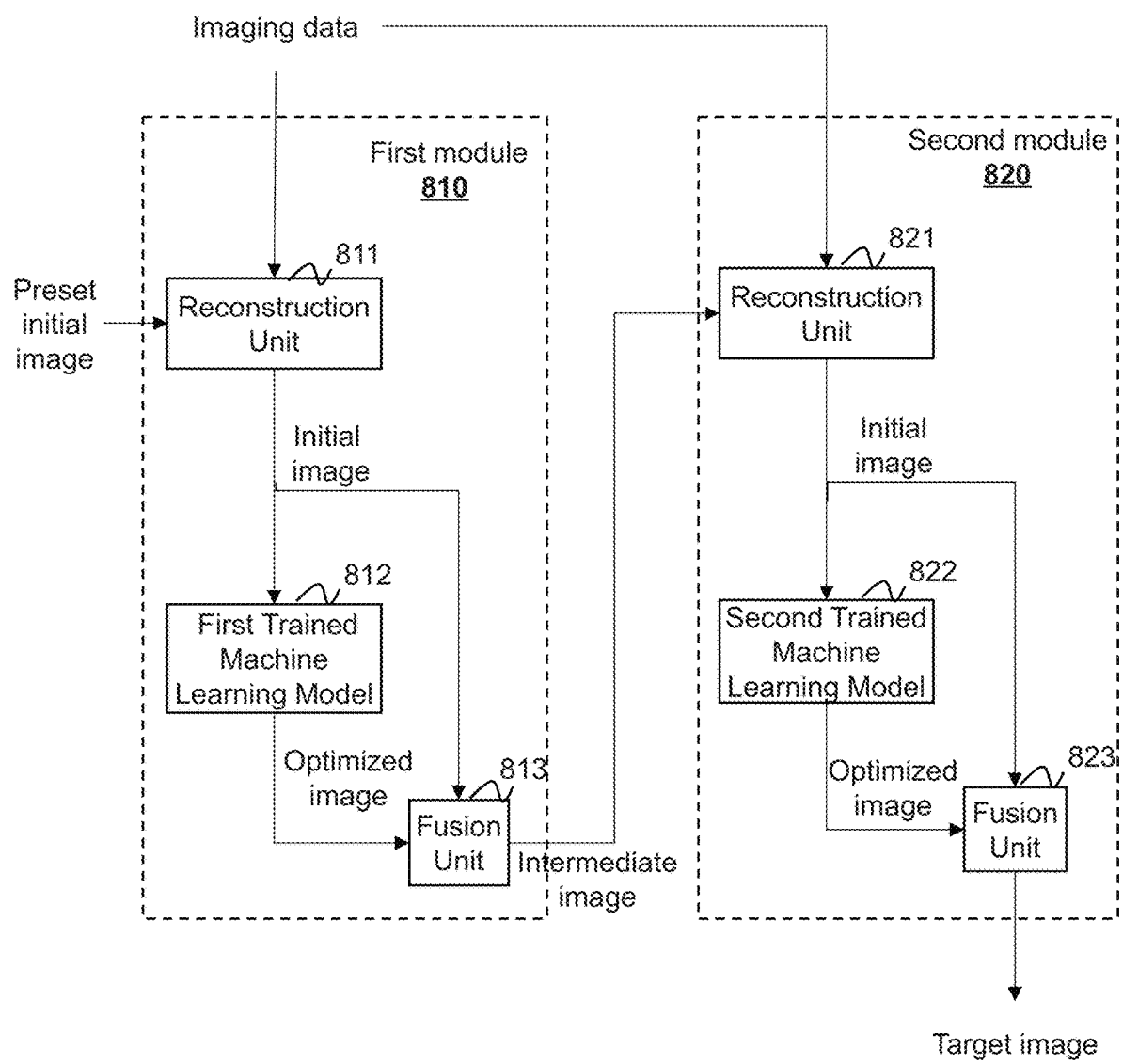
FIG. 8 is a schematic diagram illustrating a plurality of image processing subassemblies according to some embodiments of the present disclosure.

FIG. 8 is a schematic diagram illustrating a plurality of image processing subassemblies according to some embodiments of the present disclosure. As illustrated in FIG. 8, a count of a plurality of image processing subassemblies may be two including a first module 810 and a second module 820. The first module 810 may include a reconstruction unit 811, a first trained machine learning model (i.e., an optimization unit) 812, and a fusion unit 813. The second module 820 may include a reconstruction unit 821, a second trained machine learning model (i.e., an optimization unit) 822, and a fusion unit 823.

In some embodiments, the first trained machine learning model 812 may correspond to an image optimization dimension of noise reduction, and the second trained machine learning model 822 may correspond to an image optimization dimension of contrast improvement. As illustrated in FIG. 8, the first trained machine learning model 812 may be configured to optimize an image by reducing noise therein. The first module 810 may generate an intermediate image based on imaging data and a preset initial image (e.g., an image with all pixel values or voxel values of 1) using the first trained machine learning model 812, so that the intermediate image may be optimized in the image optimization dimension of the noise reduction. Further, the first module 810 may transmit the intermediate image to the second module 820 for further processing. As illustrated in FIG. 8, the second trained machine learning model 822 may be configured to optimize an image by improving contrast therein. The second module 820 may process the intermediate image based on the imaging data by using the second trained machine learning model 822 to generate a target image, which may further optimize the intermediate image in the image optimization dimension of the contrast improvement. As a result, the generated target image may be optimized in image optimization dimensions of the noise reduction and the contrast improvement, thereby comprehensively improving the image quality of the target image. In addition, each of the first trained machine learning model 812 or the second trained machine learning model 822 may be configured to perform only a single-dimensional image optimization, thereby simplifying the training of the machine learning model, reducing the complexity of the trained machine learning model, and/or improving the robustness of the trained machine learning model.

It should be noted that the first trained machine learning model 812 and the second trained machine learning model 822 are merely provided for illustration purposes, and not intended to limit the scope of the present disclosure. In some embodiments, the first trained machine learning model 812 and/or the second trained machine learning model 822 may be adjusted according to an actual imaging need. For example, in order to obtain a low-artifact and high-resolution image, the first trained machine learning model 812 may correspond to an image optimization dimension of artifact correction, and the second trained machine learning model 822 may correspond to an image optimization dimension of resolution improvement. An initial image may be optimized by input into the first trained machine learning model 812, the output of which may be input into the second trained machine learning model 822, thereby generating an image optimized in two image optimization dimensions including artifact correction and resolution improvement. As another example, if noise reduction is needed, another second module (not shown) including a third trained machine learning model corresponding to an image optimization dimension of the noise reduction may be further added.

Figure 9:
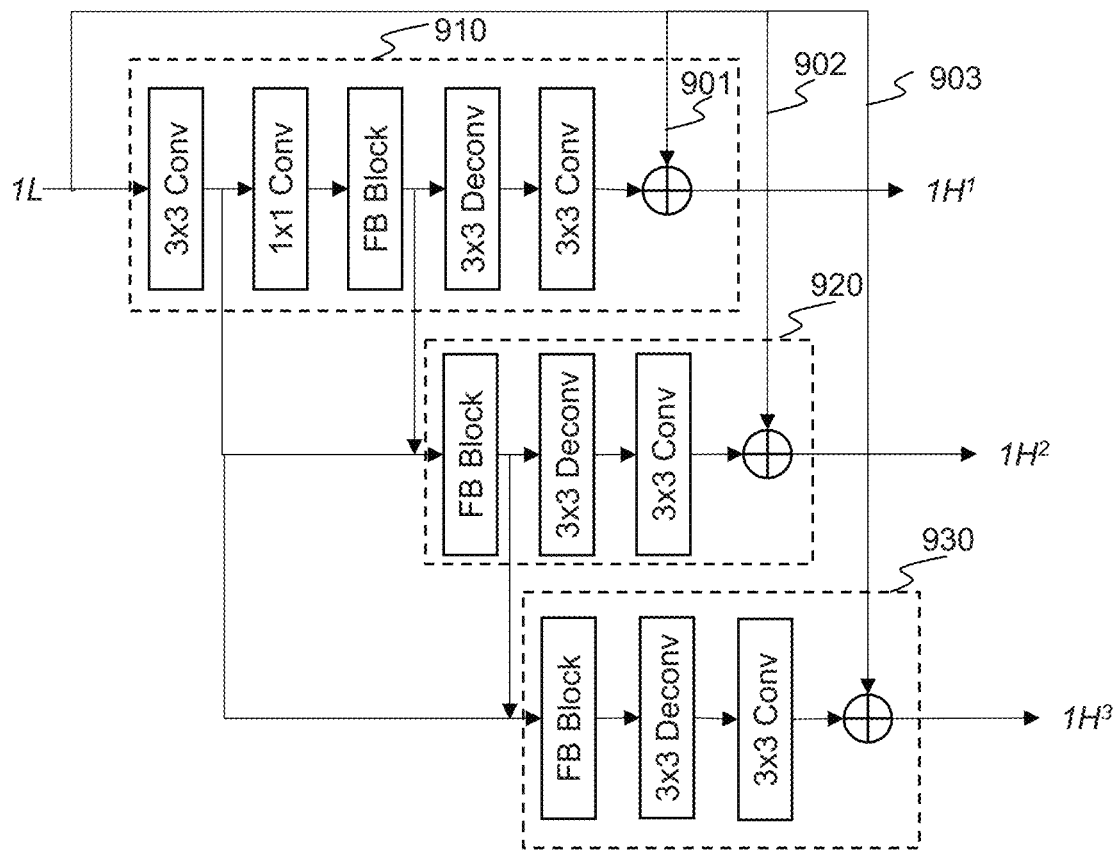
FIG. 9 is a schematic diagram illustrating a network structure of a trained machine learning model according to some embodiments of the present disclosure.

FIG. 9 is a schematic diagram illustrating a network structure of a trained machine learning model according to some embodiments of the present disclosure.

In some embodiments, a trained machine learning model may be a trained Feedback Convolutional Neural Network (FB-CNN) including a plurality of sequentially connected subnets. For example, as illustrated in FIG. 9, a FB-CNN 900 (also referred to as a model 900 for brevity) may include three subnets (e.g., a first subnet 910, a second subnet 920, a third subnet 930). In some embodiments, 1L may be an input of the model 900, and $1H^1$, $1H^2$, and $1H^3$ may be outputs of the first subnet 910, the second subnet 920, the third subnet 930, respectively. The output (e.g., $1H^3$) of the last subnet (e.g., the third subnet 930) of the model 900 may be the final output of the model 900.

In some embodiments, the input (e.g., the 1L) of the model 900 may be connected to an output of each of the plurality of subnets by a first connection component. For example, solid lines 901-903 illustrated in FIG. 9 may represent the first connection component between the input and output of the first subnet 910, the second subnet 920, the third subnet 930, respectively. Merely by way of example, the first connection component may include a residual connection. The first connection component may establish shortcuts to jump over one or more layers of the model 900 so as to solve the problem of a vanishing gradient and improve the efficiency of the training process of the model 900.

In some embodiments, each of the plurality of subnets may include at least one convolution block, at least one deconvolution block, and a feedback block (FB-block). In some embodiments, a deconvolution block may be a convolution layer, for example, a 3×3 convolution layer, a 1×1 convolution layer. A deconvolution block may be a deconvolution layer, for example, a 3×3 deconvolution layer. For example, as illustrated in FIG. 9, the first subnet 910 may include two 3×3 convolution layers, a 1×1 convolution layer, and a 3×3 deconvolution layer. The second subnet 920 or the third subnet 930 may include a 3×3 convolution layer and a 3×3 deconvolution layer. In some embodiments, an output of the FB-block in a subnet may be inputted into a next subnet connected to the subnet.

Figure 10:
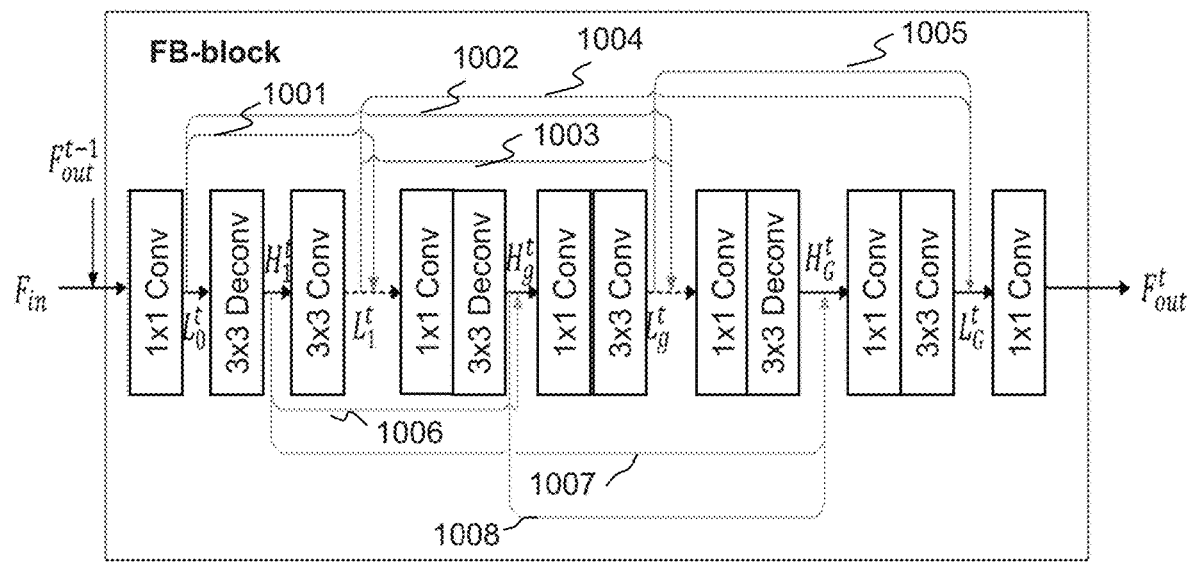
FIG. 10 is a schematic diagram illustrating a structure of a feedback block according to some embodiments of the present disclosure.

FIG. 10 is a schematic diagram illustrating a structure of a feedback-block according to some embodiments of the present disclosure. As illustrated in FIG. 10, a FB-block may include a plurality of convolution layers and deconvolution layers. The convolution layers may reduce a count of feature maps and accelerate an inference process of the model 900. A portion of the plurality of convolution layers and deconvolution layers may form projection groups each of which includes paired convolution layer and deconvolution layer. Different layers in at least part of the plurality of convolution layers and deconvolution layers may be connected via a second connection component (e.g., second connections 1001-1008). The second connection component may include a dense connection. The FB-block may enrich the expression of high-level features through the second connection components in the FB-block. The second connection components may make the transmission of gradients and features more effective and reduce a count of parameters of the model 900. The second connection components may facilitate concatenation of features of different convolution layers.

The 3×3 convolution layers (also referred to as 3×3 Conv) shown in FIG. 9 and FIG. 10 refer to convolution layers having kernel sizes of 3×3 pixels. The 1×1 convolution layers (also referred to as 1×1 Conv) shown in FIG. 9 and FIG. 10 refer to convolution layers having kernel sizes of 1×1 pixel. The 3×3 convolution layers and 1×1 convolution layers may extract features of input data. The 3×3 deconvolution layers (also referred to as 3×3 Deconv) shown in FIG. 9 and FIG. 10 refer to deconvolution layers having kernel sizes of 3×3 pixels. $F_{out}^{t-1}$ (shown in FIG. 10) represents a high-level feature after a (t−1)-th subnet, which may serve as feedback information to guide a low-level feature expression. As used herein, a high-level feature may refer to information at a large scale. Exemplary high-level features may include semantic information, etc. $F_{in}^{t}$ (shown in FIG. 10) of a t-th-subnet and enable a learning and expression capability of the model 900 to enhance gradually, and t may be 1, 2, or 3. $L_0^t$, $L_1^t$, $L_g^t$, and $L_G^t$ (shown in FIG. 10) represent low-level features, respectively. As used herein, a low-level feature may refer to information at a small scale. Exemplary low-level features may include texture, an edge, etc. $H_1^t$, $H_g^t$, and $H_G^t$ (shown in FIG. 10) represent high-level features, respectively. Each of the three subnets of the model 900 may share same weights, which may greatly compress a size of the model 900 and reduce a training time of the model 900.

Figure 11:
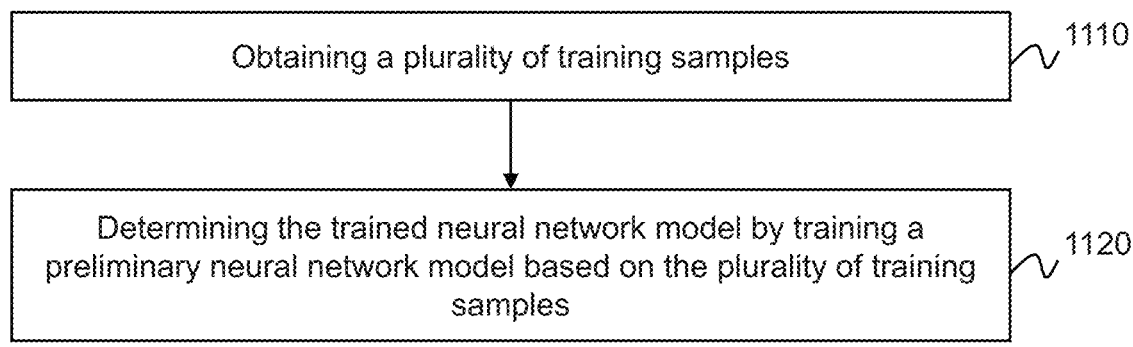
FIG. 11 is a flowchart illustrating an exemplary process for obtaining a trained machine learning model according to some embodiments of the present disclosure.

FIG. 11 is a flowchart illustrating an exemplary process for obtaining a trained machine learning model according to some embodiments of the present disclosure. In some embodiments, process 1100 may be executed by the imaging system 100. For example, the process 1100 may be implemented as a set of instructions (e.g., an application) stored in a storage device (e.g., the storage device 150, the ROM 230, the RAM 240, the storage 390). In some embodiments, the processing device 140B (e.g., the processor 220 of the computing device 200, the CPU 340 of the mobile device 300, and/or one or more modules illustrated in FIG. 4B) may execute the set of instructions and may accordingly be directed to perform the process 1100. Alternatively, the process 1100 may be performed by a computing device of a system of a vendor that provides and/or maintains such a trained machine learning model, wherein the system of the vendor is different from the imaging system 100. For illustration purposes, the following descriptions are described with reference to the implementation of the process 1100 by the processing device 140B, and not intended to limit the scope of the present disclosure.

In 1110, the processing device 140B (e.g., the obtaining module 440 illustrated in FIG. 4B, the interface circuits of the processor 220) may obtain a plurality of training samples.

Each of the plurality of training samples may include a sample input image and a sample target image. In some embodiments, both of the sample input image and the sample target image or a training sample may be generated based on a sample data set. The sample data set may refer to a data set acquired in a scan of a sample subject. The sample subject may include a specific portion, organ, and/or tissue of a patient. For example, the sample subject may include the head, the brain, the neck, the body, a shoulder, an arm, the thorax, the heart, the stomach, a blood vessel, a soft tissue, a knee, feet, or the like, or any combination thereof. In some embodiments, the sample subject may be of the same type as or a different type from the subject as described in connection with FIG. 5. For example, if the trained machine learning model is used to generate a target image of a head, the sample subject may be a sample head. In some embodiments, a type of the sample data set may be the same as a type of the imaging data as described in connection with FIG. 5. That is, the sample data set and the imaging data may be acquired by a same type of imaging device (e.g., a CT device, an MRI device, a PET device, etc.). In some embodiments, the obtaining of the at least one sample data set may be the same as or similar to the obtaining of the imaging data as described in 510, which is not repeated herein.

In some embodiments, at least one of the sample input image of a training sample or the sample target image of the training sample may be generated by an iterative reconstruction operation including at least one iteration. As described in connection with FIG. 5, exemplary reconstruction operations may include a projection operation, a transformation operation, or the like, or any combination thereof. In some embodiments, the sample input images of at least two of the plurality of training samples may be generated based on a same sample data set. For example, the processing device 140B may generate a plurality of sample input images corresponding to the plurality of training samples by performing iterative processes including different iteration counts based on the same sample data set. As another example, the processing device 140B may generate a plurality of sample input images corresponding to the plurality of training samples by performing different iterative reconstruction operations based on the same sample data set. In some embodiments, at least two of the plurality of training samples may share a same sample target image. For example, for the plurality of sample input images generated by performing different iteration counts based on the same sample data set, sample target images corresponding to the plurality of sample input images may be the same.

In some embodiments, a difference between the sample input image of a training sample and the sample target image of the training sample may be the same as the function (in terms of the image optimization dimension) of the trained machine learning model. For example, for a machine learning model corresponding to an image optimization dimension of noise reduction, a difference between the sample input image and the sample target image of a training sample to be used in the training may include that the sample target image has a lower noise level than the sample input image. Below is a description of an exemplary process for generating the sample input image and the target image of the training sample. The sample input image of the training sample may be generated based on a sample data set by a first process, and the sample target image of the training sample may be generated based on the sample data set by a second process. In the first process, the processing device 140B may determine, based on the sample data set, a sample data subset by retrieving a portion of the sample data set that corresponds to a first sampling time. Further, the processing device 140B may determine, based on the sample data subset, the sample input image by a first iterative reconstruction operation including a first count of iterations. In the second process, the processing device 140B may determine, based on the entire sample data set, the sample target image by a second iterative reconstruction operation including a second count of iterations. The first count may be the same as the second count. The entire sample data set may correspond to a second sampling time that is longer than the first sampling time. Therefore, the sample target image may have less noise than the sample input image. As a result, the machine learning model trained by such a training sample may perform the image optimization dimension of the noise reduction.

As another example, for a machine learning model corresponding to an image optimization dimension of contrast improvement, a difference between the sample input image and the sample target image of a training sample to be used in the training may include that the sample target image has a higher contrast than the sample input image. Below is a description of an exemplary process for generating the sample input image and the target image of the training sample. The sample input image of the training sample may be generated based on a sample data set by a third process, and the sample target image of the training sample may be generated based on the sample data set by a fourth process. In the third process, the processing device 140B may determine, based on the sample data set, a sample data subset by retrieving a portion of the sample data set that corresponds to a third sampling time. Further, the processing device 140B may determine, based on the sample data subset, the sample input image by a third iterative reconstruction operation including a third count of iterations. In the fourth process, the processing device 140B may determine, based on the sample data subset, the sample target image by a fourth iterative reconstruction operation including a fourth count of iterations. The fourth count may be larger than the third count. Therefore, a contrast of the sample target image may be larger than a contrast of the sample input image. As a result, the machine learning model trained by such a training sample may perform the image optimization dimension of the contrast improvement.

As a further example, below is a description of another exemplary process for generating the sample input image and the target image of the training sample of the machine learning model corresponding to the image optimization dimension of contrast improvement. The sample input image of the training sample may be generated based on a sample data set by a fifth process, and the sample target image of the training sample may be generated based on the sample data set by a sixth process. In the fifth process, the processing device 140B may determine, based on the sample data set, a first sample data subset by retrieving a portion of the sample data set that is subjected to a smoothing filtering operation. Further, the processing device 140B may determine, based on the first sample data subset, the sample input image by the fourth iterative reconstruction operation including the fourth count of iterations. In the sixth process, the processing device 140B may determine, based on the sample data set, a second sample data subset by retrieving a portion of the sample data set that is not subjected to a smoothing filtering operation. Further, the processing device 140B may determine, based on the second sample data subset, the sample target image by the fourth iterative reconstruction operation including the fourth count of iterations. In some embodiments, data amount of the first sample data subset may be equal to that of the second sample data subset.

In some embodiments, a training sample may be previously generated and stored in a storage device (e.g., the storage device 150, the ROM 230, the RAM 240, the storage 390, or an external database). The processing device 140B may retrieve the training sample directly from the storage device. In some embodiments, at least a portion of the training samples may be generated by the processing device 140B. Merely by way of example, an imaging scan may be performed on a sample subject to acquire a sample data set.

In 1120, the processing device 140B (e.g., the training module 450 illustrated in FIG. 4B, processing circuits of the processor 220) may determine the trained machine learning model by training a preliminary machine learning model based on the plurality of training samples.

In some embodiments, the preliminary machine learning model may include one or more model parameters having one or more initial values before model training. The training of the preliminary machine learning model may include one or more iterations. For illustration purposes, the following descriptions are described with reference to a current iteration. In the current iteration, the processing device 140B may input the sample input image of a training sample into the preliminary machine learning model (or an intermediate machine learning model obtained in a prior iteration (e.g., the immediately prior iteration)) in the current iteration to obtain a predicted image. The processing device 140B may determine a value of a loss function based on the predicted image and the sample target image of the training sample. The loss function may be used to measure a difference between the predicted image and the sample target image of the training sample.

Merely by way of example, a loss function of the training process may be represented as Equation (4):

$$\operatorname{argmax}_{f \geq 0} \Sigma_{ij} - a_{ij} f_j + y_{ij} \log(a_{ij} f_j) - \Sigma_k \eta_k \cdot NN(f), \quad (4)$$

where $f_j$ denotes a predicted image corresponding to a training sample, $f$ denotes the sample target image of the training sample, NN denotes the preliminary machine learning model, $a_{ij}$ denotes a system matrix of the preliminary machine learning model, and $\eta_k$ denotes a model parameter (also referred to as a weight coefficient) of the preliminary machine learning model.

Further, the processing device 140B may determine whether a termination condition is satisfied in the current iteration based on the value of the loss function. Exemplary termination conditions may include that the value of the loss function obtained in the current iteration is less than a predetermined threshold, that a certain count of iterations is performed, that the loss function converges such that the differences of the values of the loss function obtained in consecutive iterations are within a threshold, or the like, or any combination thereof. In response to a determination that the termination condition is satisfied in the current iteration, the processing device 140B may designate the preliminary machine learning model in the current iteration (or the intermediate machine learning model) as the trained machine learning model. Alternatively or additionally, the processing device 140B may further store the trained machine learning model into a storage device (e.g., the storage device 150, the ROM 230, the RAM 240, the storage 390) of the imaging system 100 and/or output the trained machine learning model for further use (e.g., in process 500).

If the termination condition is not satisfied in the current iteration, the processing device 140B may update the preliminary machine learning model in the current iteration and proceed to a next iteration. For example, the processing device 140B may update the value(s) of the model parameter(s) of the preliminary machine learning model based on the value of the loss function according to, for example, a backpropagation algorithm. The processing device 140B may designate the updated preliminary machine learning model in the current iteration as a preliminary machine learning model in a next iteration. The processing device 140B may perform the next iteration until the termination condition is satisfied. After the termination condition is satisfied in a certain iteration, the preliminary machine learning model in the certain iteration may be designated as the trained machine learning model.

It should be noted that the above descriptions regarding the process 1100 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the order of the process 1100 and/or the process 1100 may not be intended to be limiting. For example, the trained machine learning model may be previously generated and stored in a storage device (e.g., the storage device 150, the ROM 230, the RAM 240, the storage 390, or an external database), and the processing device 140B may retrieve the trained machine learning model directly from the storage device for further use (e.g., in image processing as described in connection with FIG. 5). As another example, the processing device 140B may divide the plurality of training samples into a training set and a test set. The training set may be used to train the model and the test set may be used to determine whether the training process has been completed. As a further example, the processing device 140B may update the trained machine learning model periodically or irregularly based on one or more newly-generated training samples.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
   at least one storage device including a set of instructions; and
   at least one processor in communication with the at least one storage device, wherein when executing the set of instructions, the at least one processor is directed to perform operations including:
   acquiring imaging data;
   generating multiple intermediate images based on the imaging data by performing image optimization of multiple image optimization dimensions using a plurality of trained machine learning models; and
   generating a target image based on the intermediate images,
   wherein each of the plurality of trained machine learning models is executed by one of a plurality of image processing subassemblies, the plurality of image processing subassemblies include a first module and at least one second module downstream to the first module, and each of the first module and the at least one second module includes:
     a reconstruction unit configured to generate an initial image based on the imaging data;
     an optimization unit configured to generate, using a trained machine learning model corresponding to one of the multiple image optimization dimensions, an optimized image of the optimization dimension based on the initial image; and
     a fusion unit configured to generate an intermediate image of the optimization dimension by fusing the initial image and the optimized image of the optimization dimension.

2. The system of claim 1, wherein the image optimization of multiple image optimization dimensions includes at least one of noise reduction, contrast improvement, resolution improvement, artifact correction, or brightness improvement.

3. The system of claim 1, wherein the reconstruction unit in the first module is configured to generate the initial image based on the imaging data and a preset initial image.

4. The system of claim 1, wherein the reconstruction unit in one of the at least one second module is configured to generate the initial image based on the imaging data and the intermediate image generated by the fusion unit in the first module or a previous second module connected to the second module.

5. The system of claim 1, wherein the trained machine learning model in the first module corresponds to an image optimization dimension of noise reduction.

6. The system of claim 1, wherein the generating the target image based on the intermediate images includes:
   designating the intermediate image generated by the fusion unit in a last second module of the at least one second module as the target image.

7. The system of claim 1, wherein the trained machine learning model is obtained by a training process including:
   obtaining a plurality of training samples, each of the plurality of training samples including a sample input image and a sample target image both of which are generated based on a sample data set; and
   determining the trained machine learning model by training a preliminary machine learning model based on the plurality of training samples.

8. The system of claim 7, wherein at least one of the sample input image of a training sample or the sample target image of the training sample is generated by an iterative reconstruction operation including at least one iteration.

9. The system of claim 8, wherein the sample input images of at least two of the plurality of training samples are generated based on a same sample data set.

10. The system of claim 8, wherein at least two of the plurality of training samples share a same sample target image.

11. The system of claim 8, wherein
    the sample input image of a training sample is generated based on a sample data set by a first process including:
      determining, based on the sample data set, a sample data subset by retrieving a portion of the sample data set that corresponds to a first sampling time; and
      determining, based on the sample data subset, the sample input image by a first iterative reconstruction operation including a first count of iterations; and
    the target image of the training sample is generated based on the sample data set by a second process including:
      determining, based on the entire sample data set, the sample target image by a second iterative reconstruction operation including a second count of iterations, wherein
    the entire sample data set corresponds to a second sampling time that is longer than the first sampling time, and
    the first count is the same as the second count.

12. The system of claim 8, wherein
the sample input image of a training sample is generated based on a sample data set by a third process including:
  determining, based on the sample data set, a sample data subset by retrieving a portion of the sample data set that corresponds to a third sampling time; and
  determining, based on the sample data subset, the sample input image by a third iterative reconstruction operation including a third count of iterations; and
the target image of the training sample is generated based on the sample data set by a fourth process including determining, based on the sample data subset, the sample target image by a fourth iterative reconstruction operation including a fourth count of iterations, wherein
the fourth count is larger than the third count.

13. The system of claim 8, wherein
the sample input image of a training sample is generated based on a sample data set by a fifth process including:
  determining, based on the sample data set, a first sample data subset by retrieving a portion of the sample data set that is subjected to a smoothing filtering operation; and
  determining, based on the first sample data subset, the sample input image by a fourth iterative reconstruction operation including a fourth count of iterations; and
the sample target image of the training sample is generated based on the sample data set by a sixth process including:
  determining, based on the sample data set, a second sample data subset by retrieving a portion of the sample data set that is not subjected to a smoothing filtering operation; and
  determining, based on the second sample data subset, the sample target image by the fourth iterative reconstruction operation including the fourth count of iterations.

14. The system of claim 1, wherein
the trained machine learning model is a trained Feedback Convolutional Neural Network (FB-CNN) including a plurality of sequentially connected subnets, and
an input of the FB-CNN is connected to an output of each of the plurality of subnets by a first connection component.

15. The system of claim 14, wherein
each of the plurality of subnets includes at least one convolution block, at least one deconvolution block, and a feedback block (FB-block), an output of the FB-block in the subnet being inputted into a next subnet connected to the subnet,
the FB-block includes a plurality of convolution layers and deconvolution layers, a portion of the plurality of convolution layers and deconvolution layers forming projection groups each of which includes paired convolution layer and deconvolution layer, and
different layers in at least part of the plurality of convolution layers and deconvolution layers are connected via a second connection component.

16. A method for image processing, implemented on a computing device having at least one storage device storing a set of instructions, and at least one processor in communication with the at least one storage device, the method comprising:
  acquiring imaging data;
  generating multiple intermediate images based on the imaging data by performing image optimization of multiple image optimization dimensions using a plurality of trained machine learning models; and
  generating a target image based on the intermediate images,
  wherein each of the plurality of trained machine learning models is executed by one of a plurality of image processing subassemblies, the plurality of image processing subassemblies include a first module and at least one second module downstream to the first module, and each of the first module and the at least one second module includes:
    a reconstruction unit configured to generate an initial image based on the imaging data;
    an optimization unit configured to generate, using a trained machine learning model corresponding to one of the multiple image optimization dimensions, an optimized image of the optimization dimension based on the initial image; and
    a fusion unit configured to generate an intermediate image of the optimization dimension by fusing the initial image and the optimized image of the optimization dimension.

17. The system of claim 16, wherein the image optimization of multiple image optimization dimensions includes at least one of noise reduction, contrast improvement, resolution improvement, artifact correction, or brightness improvement.

18. A non-transitory computer readable medium, comprising executable instructions that, when executed by at least one processor, direct the at least one processor to perform a method, the method comprising:
  acquiring imaging data;
  generating multiple intermediate images based on the imaging data by performing image optimization of multiple image optimization dimensions using a plurality of trained machine learning models; and
  generating a target image based on the intermediate images,
  wherein each of the plurality of trained machine learning models is executed by one of a plurality of image processing subassemblies, the plurality of image processing subassemblies include a first module and at least one second module downstream to the first module, and each of the first module and the at least one second module includes:
    a reconstruction unit configured to generate an initial image based on the imaging data;
    an optimization unit configured to generate, using a trained machine learning model corresponding to one of the multiple image optimization dimensions, an optimized image of the optimization dimension based on the initial image; and
    a fusion unit configured to generate an intermediate image of the optimization dimension by fusing the initial image and the optimized image of the optimization dimension.

* * * * *